United States Patent [19]

Schweizer et al.

[11] Patent Number: 5,244,322
[45] Date of Patent: Sep. 14, 1993

[54] CLAMPING DEVICE FOR INDIVIDUAL TOOLS

[75] Inventors: Ernst Schweizer, Nürtingen; Horst Kalestra, Neckartenzlingen, both of Fed. Rep. of Germany

[73] Assignee: Gebr. Heller Maschinenfabrik Gesellschaft mit beschränkter Haftung, Nürtingen, Fed. Rep. of Germany

[21] Appl. No.: 916,019

[22] Filed: Jul. 17, 1992

[30] Foreign Application Priority Data

Jul. 19, 1991 [DE] Fed. Rep. of Germany ....... 4123966

[51] Int. Cl.$^5$ .............................................. B23B 31/00
[52] U.S. Cl. ........................................ 409/233; 82/160
[58] Field of Search ................... 82/160; 409/231, 233; 408/239 R, 239 A, 238, 56; 483/18, 19, 24, 25, 26, 27

[56] References Cited

U.S. PATENT DOCUMENTS

| 3,851,562 | 12/1974 | Tomita et al. | 409/233 |
| 3,867,756 | 2/1975 | Koch et al. | 483/24 |
| 4,084,462 | 4/1978 | Grinage | 82/158 |
| 4,642,006 | 2/1987 | Wirfelt | 409/233 |
| 4,822,220 | 4/1989 | Danielsson et al. | 409/233 |
| 4,890,523 | 1/1990 | Satran | 82/160 |
| 4,951,578 | 8/1990 | von Haas et al. | 409/231 |

FOREIGN PATENT DOCUMENTS

| 0295315 | 6/1987 | European Pat. Off. . | |
| 0275441 | 12/1987 | European Pat. Off. . | |
| 3108439 | 3/1981 | Fed. Rep. of Germany . | |
| 3514829 | 4/1985 | Fed. Rep. of Germany . | |
| 3807140 | 3/1988 | Fed. Rep. of Germany . | |
| 3814550 | 4/1988 | Fed. Rep. of Germany . | |
| 3831666 | 9/1988 | Fed. Rep. of Germany . | |
| 3834192 | 10/1988 | Fed. Rep. of Germany . | |
| 3904259 | 2/1989 | Fed. Rep. of Germany . | |
| 3939227 | 11/1989 | Fed. Rep. of Germany . | |
| 4024645 | 8/1990 | Fed. Rep. of Germany. . | |
| 173405 | 10/1982 | Japan | 82/160 |
| 109241 | 6/1983 | Japan | 901/41 |

Primary Examiner—Daniel W. Howell
Attorney, Agent, or Firm—Robert W. Becker & Associates

[57] ABSTRACT

A clamping device for individual tools has a spindle and a pulling member connected inside the spindle. The pulling member has a conical clamping and centering element projection from the spindle. A tool holder has an end face with a recess, the recess having at least one conical mantle surface. The conical mantle surface cooperates with the conical clamping and centering element for clamping and centering the tool holder at the spindle.

30 Claims, 6 Drawing Sheets

CLAMPING DEVICE FOR INDIVIDUAL TOOLS

BACKGROUND OF THE INVENTION

The present invention relates to a clamping device for individual tools having a pulling member arranged within a spindle whereby a tool or tool holder is clamped and centered at the spindle with the aid of the pulling member.

A plurality of clamping devices is known with which individual tools may be connected directly or via a tool holder to the spindle of a working machine. For example, German Patent 31 08 439 discloses a drilling tool with a head portion having a cylindrical fitting lug that engages a corresponding fitting bore of a tool holder. Such clamping devices are commercially available as so-called ABS clamping systems manufactured by the German company Komet. In such systems, two fastening screws are provided in the wall of the fitting bore and are diametrically opposed to one another. Their inner end faces have conical depressions which are engaged by conically shaped ends of a connecting bolt which is supported in a transverse bore of the fitting lug. The axes of the conically shaped ends of the connecting bolt and of the conical depressions of the fastening screws are staggered relative to one another. With this arrangement, by screwing the fastening screws into the fitting bore, the connecting bolt and thus the head portion is axially clamped relative to the tool holder.

Due to the cylindrical embodiment of the fitting lug the fitting lug and the corresponding fitting bore must be very precisely machined. In order to achieve clamping an exact arrangement of the fastening screws and of the connecting bolt must be ensured in order to accomplish the axial staggering which is necessary for the axial clamping. The changing operation and the clamping step are thus very time consuming and difficult.

Another clamping device for individual tools is known from German Offenlegungschrift 35 14 829 in which the spindle has a conical bore into which a conical shaft of the tool is inserted. Within the spindle radially slidable wedge elements are provided which cooperate with wedge-shaped grooves in the spindle and are connected via a cam arrangement to an axially movable pulling rod extending axially within the spindle. This clamping device requires a great constructive expenditure. Since the conical shaft of the tool must be inserted axially into the receiving bore of the spindle the exchange operation is again rather time consuming. In order for the radially movable wedge elements to generate the axial clamping, the wedge elements the wedge grooves must be provided with respective slanted surfaces within the spindle which require an exact machining and an exact mounting of the wedge elements.

With the clamping device according to European Patent 0 275 441 fastening screws are again used which cooperate via spherical intermediate elements with ends of a connecting bolt inserted in a transverse bore of the tool holder. The spherical connecting elements have clamping surfaces arranged at a slant relative to the axis of the tool, the clamping surfaces cooperating with respective slanted surfaces of the connecting bolt during the axial clamping. The connecting bolt is again supported within a cylindrical fitting piece that is inserted into a respective cylindrical fitting bore of the spindle. This clamping device also requires a great constructive expenditure and is comprised of parts which require minimal tolerances. A simple and fast tool exchange is thus impossible.

German Offenlegungschrift 38 07 140 shows a clamping device in which clamping jaws are supported at the spindle, the clamping jaws moved via a pulling rod into the release or clamping position. The tool holder engages with a cylindrical fitting sleeve the receiving bore of the spindle. The inside of the fitting sleeve is provided with groove-shaped recesses which are engaged by the clamping jaws and thus generate an axial clamping force between the spindle and the tool holder. In order to allow for a pivoting movement of the clamping jaws, an additional conical pushing part is required at the spindle. This clamping device is thus comprised of a plurality of parts. Due to the cylindrical fitting sleeve of the tool holder a very precise manufacturing of the fitting sleeve and the receiving bore of the spindle is necessary. The exchange process is difficult because the fitting sleeve of the tool holder must be exactly inserted into the receiving bore of the spindle. Because of the fitting sleeve, as described above for the other clamping device a greater insertion play must be provided in order to be able to insert the fitting sleeve with ease into the receiving bore of the spindle.

The European Patent 0 295 315 shows a clamping device in which in the side walls of the cylindrical receiving bore of the spindle radially extending fastening screws are provided which engage with conically shaped screw heads conically shaped depressions within the ends of a clamping element arranged transverse to the axis of the spindle. By fastening the fastening screws the tool holder is axially clamped at the spindle via the conical surfaces. This clamping device also requires a great constructive expenditure and is furthermore comprised of a great number of individual parts. Also, due to the insertion step the exchange process is rather time-consuming.

In the clamping device according to German Patent 38 14 550 the tool holder is provided with a conical or cylindrical centering projection via which the tool holder engages a respective receiving bore of the spindle. The spindle is provided with a centrally arranged axially extending pulling rod for moving clamping jaws radially outwardly in a translatory movement. The tool holder is axially pulled via the centering projection against the spindle. In order to generate the translatory movement of the individual clamping, jaws a complicated design of the clamping jaws, the pull rod, and the receiving bore of the spindle is necessary. Also, with the described clamping device a plurality of parts is required. Since the tool holder must be inserted with its centering projection into the receiving bore of the spindle, the exchange process requires a substantial amount of time.

German Offenlegungschrift 38 31 666 discloses a clamping device in which a projection of the tool holder is inserted into the receiving bore of the spindle. The spindle comprises a pull rod and a clamping rod arranged axially slidable therein with which the tool holder may be axially clamped at the spindle. Additionally, clamping elements are provided with which the projection of the tool holder, which extends axially into the receiving bore of the spindle, is engaged. This known clamping device is again comprised of a plurality of parts and is therefore expensive to manufacture and requires a relatively long changing time.

Another known clamping device is disclosed in German Offenlegungschrift 38 34 192 and comprises again a plurality of clamping elements disposed within the spindle. Via an axially movable actuating rod the clamping elements engage and clamp a projection of the tool holder extending into the receiving bore of this spindle. The wall of the receiving bore of the spindle as well as the outer mantle surface of the projection of the tool holder are provided with cylindrical fitting surfaces arranged axially one after another. Due to these cylindrical fitting surfaces the projection of the tool holder and the receiving bore of the spindle have a complicated design which is expensive and time-consuming to manufacture. The individual cylindrical surfaces must furthermore be produced with very small tolerances. Since the tool holder with its projection must be inserted into the receiving bore of the spindle short exchange times are not achievable.

In a further known clamping device (German Offenlegungsschrift 39 04 259) the tool holder is inserted with a projection into a receiving bore of the spindle and is fastened therein with clamping jaws. The clamping jaws are permanently prestressed by an axially acting spring arrangement in the form of a cup spring package so that the jaw segments of the clamping jaws are forced radially inwardly. With a radial adjustment screw the clamping jaws are radially outwardly pivoted against the force of the spring arrangement in order to fasten the projection of the tool holder. Due to the clamping jaws and the spring arrangement a plurality of parts is required for the clamping device. Since the tool holder with its projection must be axially inserted into the receiving bore of the spindle short changing times are not achievable.

Another clamping device is known from German Offenlegungsschrift 39 39 227 in which a cylindrical clamping sleeve of the tool holder extends into the receiving bore of the spindle and is fastened therein with expanding levers. The expanding levers may be positioned in their holding position via a pull rod and a pull bolt. For guiding the pull bolt and the pull rod the spindle further comprises a guide bushing. Due to the plurality of parts the clamping device requires a great constructive expenditure. The axial insertion step makes the changing of the tool holder more difficult and results in longer exchange times.

Another clamping device is known from German Offenlegungsschrift 40 24 645 in which a cylindrical fitting lug of the tool holder extending into the cylindrical receiving bore of the spindle is provided with a transverse bore in which a clamping bolt is slidably arranged transverse to the axis of the fitting lug. A first conically shaped end extends into a conically shaped depression of a fastening screw, while the other end is provided with a conical depression into which the conically shaped tip of a further fastening screw extends. The axes of the two diagonally opposed fastening screws are aligned relative to one another and are spaced relative to the axis of the clamping bolt. When one of the two fastening screws is turned inwardly, the axial clamping between the tool holder and the spindle is achieved by the conical surfaces of the fastening screw and the clamping bolt contacting one another. The axial staggering between the clamping bolt and the fastening screws requires an exact manufacturing of the fitting lug of the tool holder as well as the positioning of the bores for receiving the fastening screws so that the manufacture of the clamping device is very expensive. Furthermore, due to the insertion step the exchange time is again relatively long.

It is therefore an object of the present invention to provide a clamping device of the aforementioned kind which is comprised of only a few parts, which is easy and inexpensive to manufacture, and which is embodied such that the tool holder, respectively, the tool may be exchanged within a short period of time.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
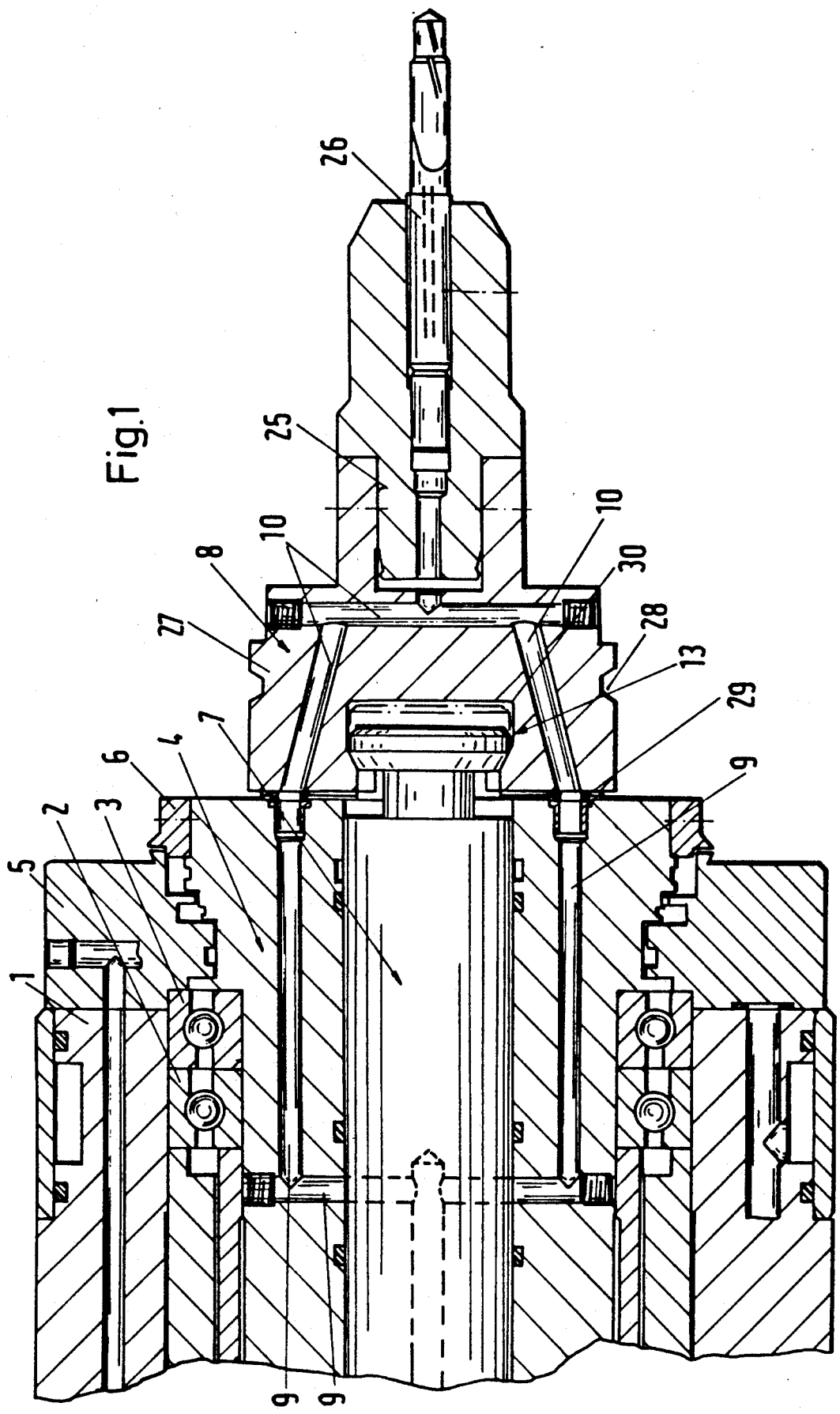
FIG. 1 is a longitudinal cross-sectional view of an inventive clamping device for individual tools.

The clamping device for individual tools according to the present invention is primarily characterized by a spindle, a pulling member connected inside the spindle and having a conical clamping and centering element projecting from the spindle and a connecting member of a tool having an end face with a recess, the recess having at least one conical mantle surface cooperating with the conical clamping and centering element for clamping and centering the tool at the spindle. The connecting member may be a part of the tool or a separate tool holder.

Preferably, the pulling member further comprises a base body and a neck having a reduced diameter relative to the base body, the clamping and centering element connected with the neck to the base body.

Preferably the recess opens perpendicular to an axis of the connecting member or tool.

Expediently, the conical mantle surface is comprised of two conical mantle surface segments arranged on a common imaginary conical mantle surface. The recess preferably extends diametrically in the end face of the connecting member and widens toward an outer mantle surface of the connecting member The recess has two oppositely arranged lateral surfaces with opposite circular curvatures. Each of the lateral surfaces has a shoulder extending perpendicularly to the lateral surfaces toward one another, each shoulder having one of the conical mantle surface segments The recess has a planar bottom, the bottom being spaced from the conical mantle surface segments at a distance that is greater than an axial thickness of the clamping and centering element. Expediently, the recess is smaller at the end face of the tool holder than at the bottom. Furthermore, a width of the recess at the end face of the connecting member is smaller than a diameter of the clamping and centering element.

Preferably, an axis of the imaginary conical mantle surface on which the conical mantle surface segments are arranged coincides with an axis of the connecting member and an axis of the pulling member.

The neck is expediently narrower than the recess at the end face of the connecting member. Preferably, the neck has two parallel outer surfaces extending in a longitudinal direction of the recess.

In another embodiment of the present invention, the end face of the connecting member has first projections and an end face of the spindle, the end face of the spindle facing the connecting member, has second projections, the spindle and connecting member contacting one another with the first and the second projections. Preferably, the first and the second projections are congruent. The spindle further comprises at least one compressed air bore opening within an end face of one of the second projections.

Advantageously the end face of the connecting member further comprises first segment-shaped depressions between the first projection, and the end face of the spindle further comprises second segment-shaped depressions between the second projections.

Preferably, the first projections extend radially relative to an axis of the tool holder and the second projections extend radially to an axis of the spindle. The first projections extend essentially from the recess to an outer mantle surface of the connecting member.

In a further embodiment of the present invention, the clamping and centering element has a conical clamping surface and compressed air bores opening within the conical clamping surface.

It is preferred that the device comprises at least one follower connected to the connecting member and the spindle for connecting the connecting member and the spindle in a rotationally fixed manner in a direction of rotation of the device. The follower is expediently axially slidably mounted within the spindle. Preferably, the follower is drivably connected with the pulling member and is slidable counter to the pulling member.

In a preferred embodiment, the pulling member has a toothing and the spindle has a toothed wheel, the toothing engaging the toothed wheel. Preferably, the follower also has a toothing that engages the toothed wheel.

During a tool exchange the follower is hidden within the spindle. Expediently, the connecting member has a groove at the end face. The groove opens to an outer mantle surface of the connecting member. The groove has an inner side wall remote from the outer mantle surface of the connecting member, the inner side wall being shaped corresponding to a part of the follower engaging the groove.

In the inventive clamping device the connecting member, respectively, the tool is centered and clamped relative to the spindle in one single step due to the conically shaped clamping and centering element of the pulling member. Since the clamping and centering element of the pull member is arranged outside of the spindle and the conical mantle surfaces or mantle surface segments are provided at a recess within the end face of the connecting member the connecting member (i.e., the tool or the tool holder) must not be inserted into the spindle. Accordingly, the tool, respectively, the tool holder is not provided with a projection that must be inserted into a receiving bore of the spindle. The tool, respectively, the tool holder is pushed onto the clamping and centering element transverse to the axis of the pulling member, and the pulling member must then be axially retracted so that via the contacting conical surfaces the tool, respectively, the tool holder is centered and clamped. Since the tool, respectively, the tool holder must not be inserted into a receiving bore of a spindle, the exchange step may be performed within a very short period of time. It is especially advantageous that the commonly required difficult clamping mechanism with adjustable, respectively, pivotable clamping elements is obsolete so that the inventive clamping device may be manufactured very inexpensively. The clamping device represents an ideal interface for rotating and stationary tools. In principle, the clamping device is suitable for machining centers, turning units, transfer units, and specialty machines. Already existing machines may be retrofitted with the inventive clamping device. The inventive clamping device fulfills all requirements with respect to stability, exactness of positioning, insensitivity to soiling, forceless fitting, short exchange times, and the possibility to automize the tool exchange.

Description of Preferred Embodiments

The present invention will now be described in detail with the aid of several specific embodiments utilizing FIGS. 1 through 6

Figure 2:
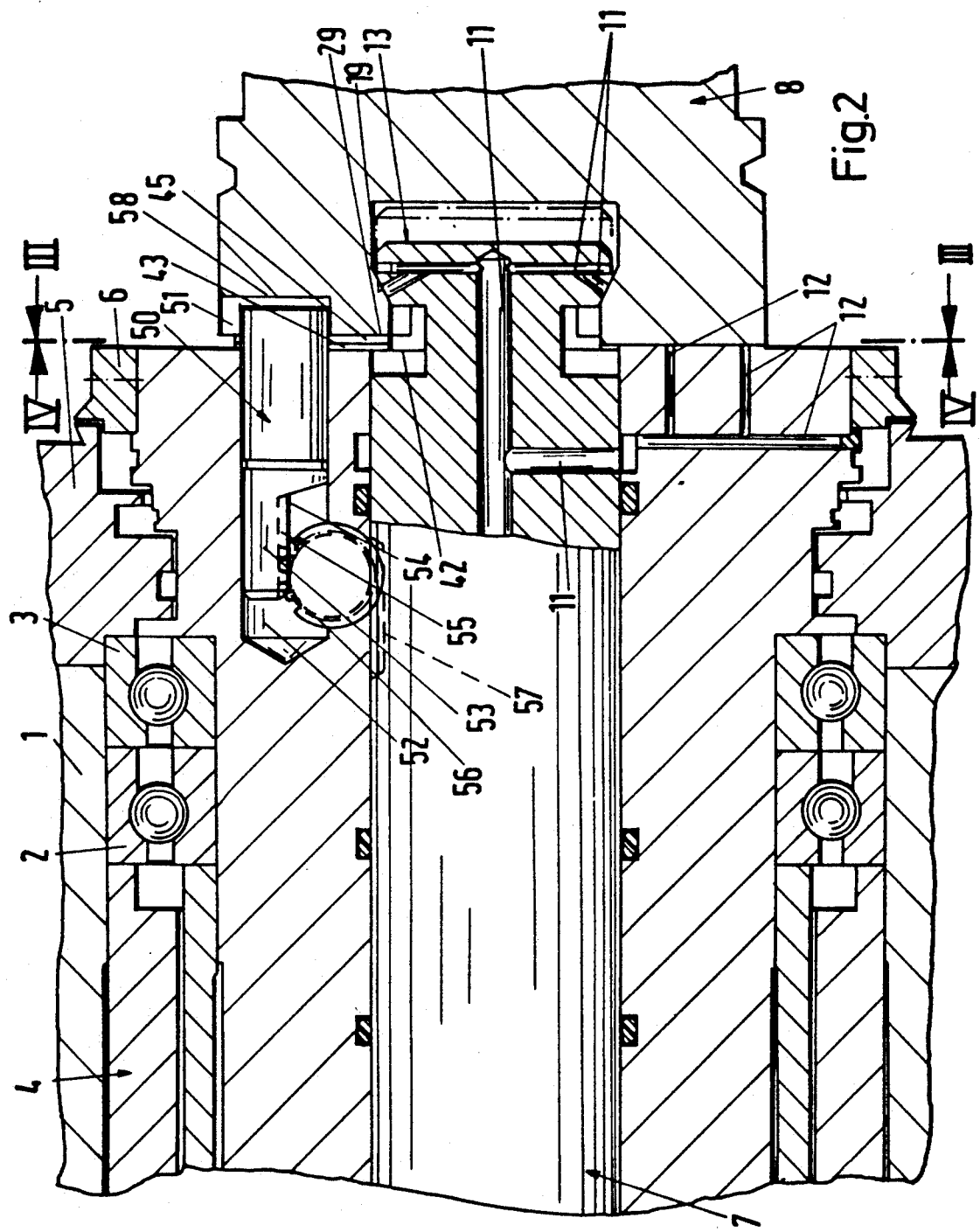
FIG. 2 is an enlarged view of a section along the line II—II
Figure 3:
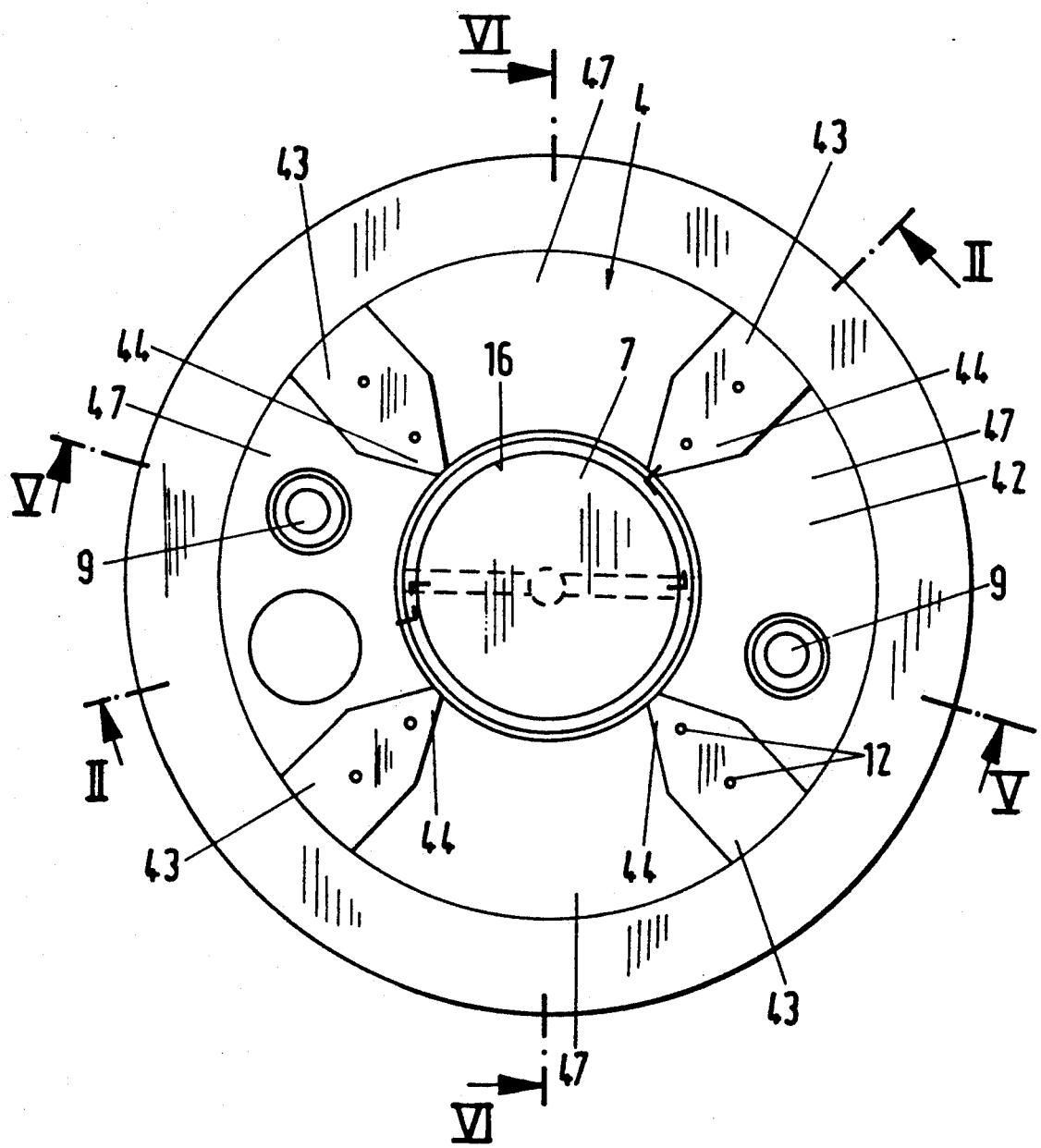
FIG. 3 a view along the line III—III of FIG. 2.

FIG. 1 shows a longitudinal section of a part of a housing 1 of a working machine or working unit. A working spindle 4 is supported within the housing 1 via a bearing 2, 3. The end face of the housing 1 is provided with a cover 5 through which the working spindle 4 extends to the exterior. A slinger ring 6 is fastened to the projecting end of the working spindle 4 which, in a known manner, is spaced at a small distance from the end face of the cover 5 (FIG. 2). An axial pulling member or pulling rod 7 is centrally arranged within the spindle 4, the pulling member being axially movable in a known manner for clamping and positioning a connecting member 8 embodied as a tool holder. However, the connecting member may also be a part of the tool itself.

The spindle 4 is provided with coolant bores 9 which are connected to respective coolant bores 10 of the tool holder 8 upon attachment of the tool holder 8 to the spindle 4. The pulling rod or pulling member 7 is provided with compressed air bores 11 (FIG. 2) which are connected, as will be described in the following, with compressed air bores 12 within the spindle 4.

The pulling member 7 at its free end i provided with a clamping and centering head 13 with which the tool holder 8 is positioned and clamped in one single operation. The clamping and centering head 13 is connected via a neck 14 to a pulling member base body 15 (FIGS. 4 and 5) which sealingly rests at the inner wall of a bore 16 extending axially and centrally through the spindle 4. The clamping and centering head 13, the neck 14, and the pulling member base body 15 are advantageously embodied as one piece.

Figure 5:
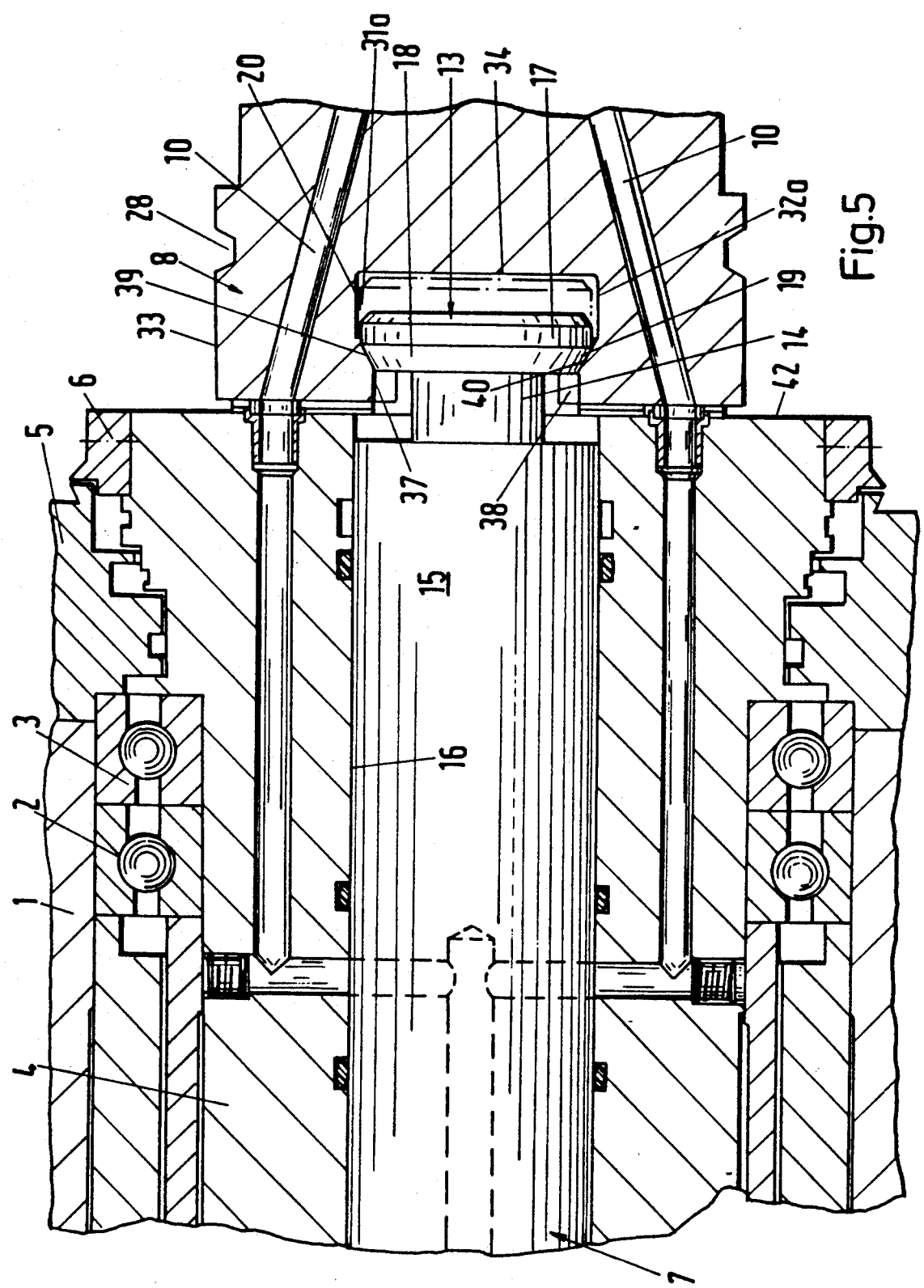
FIG. 5 is a section along the line V—V of FIG. 3.

The clamping and centering head 13 at its end face is provided with a cylindrical end piece 17. The end piece 17 is connected to the neck 14 via a frustrum-shaped clamping and positioning (centering) element 18. The clamping and centering element 18 tapers in the direction toward the neck 14 (FIG. 5). The clamping and centering element 18 has a conically shaped clamping surface 19 which has its greatest diameter at the transition to the cylindrical mantle surface 20 of the end piece 17.

Figure 4:
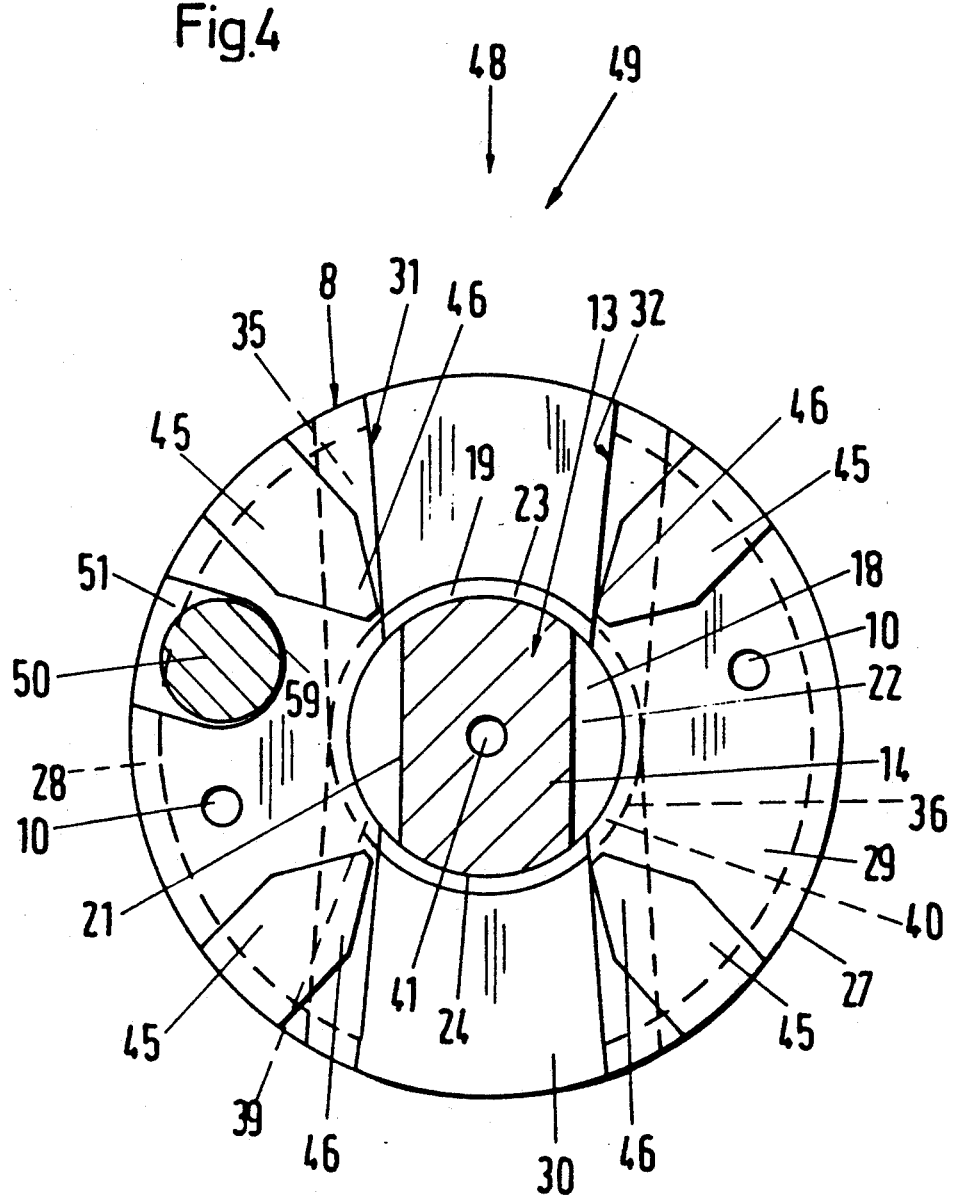
FIG. 4 is a view along the line IV—IV of FIG. 2.
Figure 6:
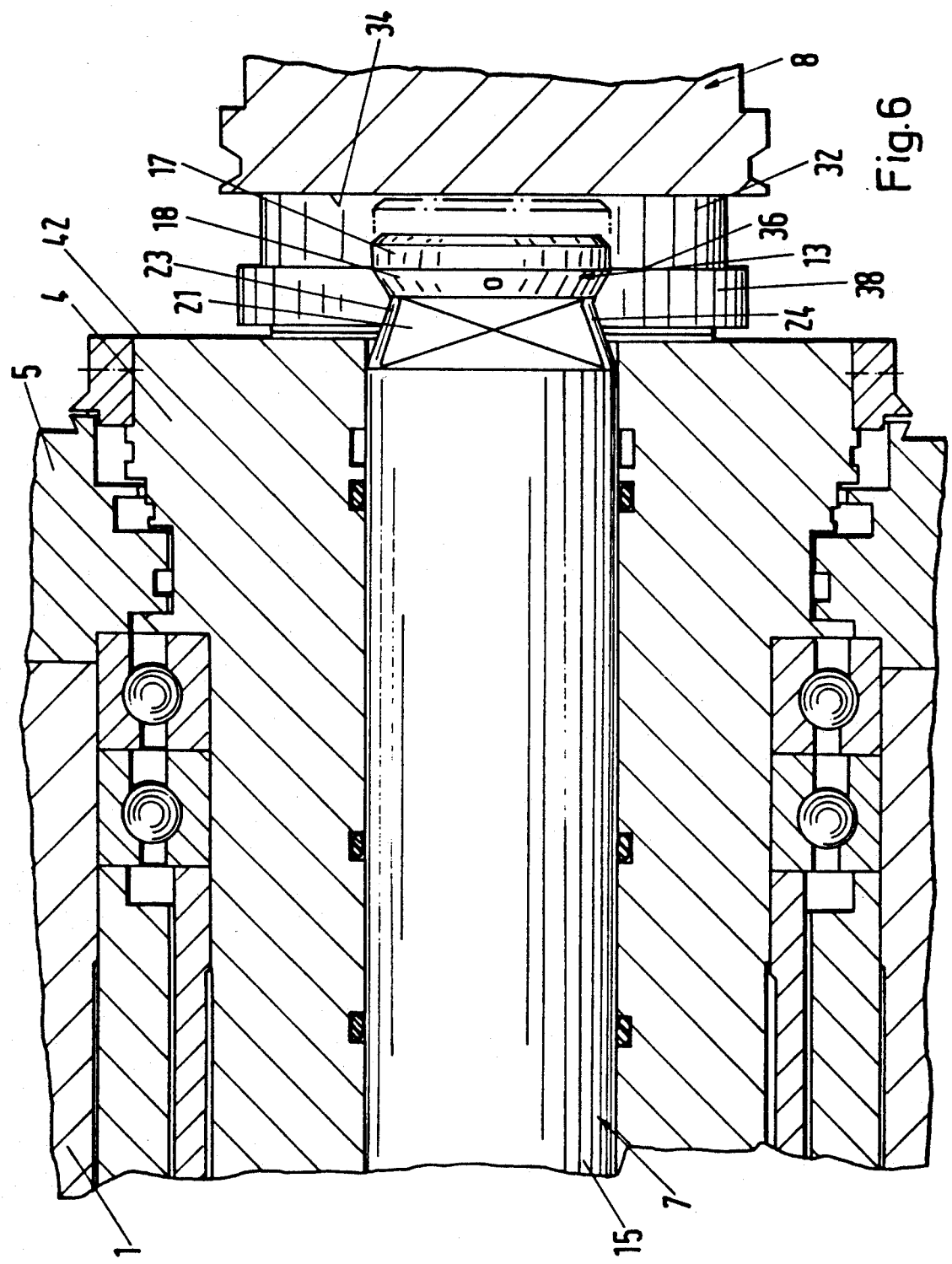
FIG. 6 is a section along the line VI—VI of FIG. 3.

As shown in FIG. 4, the neck 14 has two parallel planar outer surfaces 21, 22 having a distance between them which is smaller than the diameter of the clamping and centering head 13. The planar outer surfaces 21, 22 extend from the head 13 to the pulling member base body 15 (FIG. 5). As shown in FIG. 6, the two planar outer surfaces 21, 22 have a trapezoidal contour. As can be seen in FIGS. 4 and 6, the two outer surfaces 21 and 22 are connected to one another by conical mantle surface segments 23 and 24. These conical mantle surface segments 23 and 24 ar arranged on the outer mantle surface of an imaginary cone which widens from the clamping and centering element 18 in the direction toward the base body 15 of the pulling member 7.

The tool holder 8 has a receiving opening 25 (FIG. 1) in which the tool 26 is fastened in a known manner. The tool holder 8 has a cylinder portion 27 of a wider diameter with a mantle surface provided with a gripping groove 28 for a gripping tool of a tool changer which is not represented in the drawings.

The cylindrical part 27 has a groove-like recess 30 at its end face 29 facing the working spindle 4. This recess 30 will be described in the following with the aid of FIGS. 4 to 6.

The recess 30 extends diagonally (FIG. 4) and is limited by two lateral surfaces 31, 32 extending in the axial direction of the tool holder 8 and having opposite circular curvatures (FIG. 4). Accordingly, the width of the recess 30 decreases from the cylindrical mantle surface 33 of the cylindrical part 27. As can be seen in FIG. 5, the bottom 34 of the recess 30 is planar. The lateral surface segments 31a and 32a extend perpendicularly to the bottom 34. At a distance from the bottom 34 these lateral surface segments 31a and 32a have a transition into shoulders 35 and 36 which extend perpendicularly relative to the lateral surface segments 31a, 32a toward one another. The shoulders 35 and 36 have a distance from the bottom 34 of the recess 30 that is greater than the thickness of the clamping and centering head 13. The shoulders 35, 36 have circularly curved terminal surface segments 37 and 38 which are extending perpendicular to the end face 29 of the tool holder 8.

The neck 14 of the pulling member 7 is, as can be seen in FIG. 4, narrower than the recess 30 so that the tool holder 8 can be laterally pushed onto the clamping and centering head 13 when the pulling member 7 is axially extended and its clamping and centering head 13 is in the position indicated in a dash-dotted line in FIG. 6. The clamping and centering head 13 is then positioned within the area between the bottom 34 and the shoulders 35 and 36. In this position of the pulling member the tool holder 8 may be laterally pushed onto the clamping and centering head 13. Since the recess 30 widens steadily in the direction toward both ends, an easy pushing of the tool holder onto the clamping and centering head 13 is ensured. The distance between the bottom 34 and the shoulders 35, 36 is so great that the tool holder 8 may be pushed onto the clamping and centering head 13 in a contact-free manner. At half their length the shoulders S5 and 36 are each provided with conical mantle surface segments 39, 40 (FIGS. 4 and 5), which are arranged on a common imaginary conical mantle surface. The axis of the common imaginary conical mantle surface corresponds to the axis 41 of the cylindrical part 27 of the tool holder 8. This imaginary conical mantle surface has the same conical angle as the clamping surface 19. When the tool holder 8 is pushed onto the clamping and centering head 13 to such an extent that the clamping surface 19 is at the same latitude as the conical mantle surface segments 39 and 40, the pulling member 7 is axially retracted. The clamping surface 19 then contacts the two conical mantle surface segments 39 and 40 whereby the tool holder 8 is forced against the spindle 4 and clamped. Furthermore, due to the conical surfaces the tool holder 8 is also simultaneously positioned and centered. Since the tool centering takes place via the conical mantle surface segments 39, 40 and the conical clamping surface 19, the tool holder 8 must not be provided with a shaft which is to be axially inserted into the spindle 4. Thus, an axial inserting, respectively, removing movement of the tool holder 8 is not required. The tool holder 8 is only radially pushed onto the clamping and centering head 13 Accordingly, the tool exchange time is very short.

The pulling member 7 which extend axially through the spindle 4 has only a very slight play in order to ensure a reliable extension and retraction of the pulling member. Due to the minimal play of the pulling member 7 within the spindle 4 in connection with the radial positioning of the tool holder 8, a high degree of changing precision is ensured. Due to the aforementioned conical centering positioning via the conical surfaces 19, 39, and 40, the fitting play between the tool holder 8 and the spindle 4 is easily eliminated. Accordingly, the already very high degree of changing precision is additionally increased.

The end face 42 (FIG. 2) of the spindle 4 is provided with projections 43 arranged over its circumference. The projections 43 are radially arranged and taper off in the direction of the bore 16 to form a tip 44. In the embodiment represented in the drawings, four projections 43 are provided which are spaced at an angle of 90° relative to one another. They are narrow so that between them depressions are formed which extend over an angular zone of approximately 60° to 70°. The end faces of the projections 43 are planar and form clamping surfaces at which respective projections of the tool holder 0 will rest. Two of the compressed air bores 12 open within each projection 43. Coolant bores 8 open into two of the depressions such that they are diametrically opposed relative to one another. When the tool holder 8 is attached to the spindle 4, the coolant bores 9 are connected in a known manner with the coolant bores 10 of the tool holder 8.

The end face 29 of the tool holder 8 is provided with congruent projections 45 (FIG. 4) which are also radially arranged and taper off in the direction of the axis of the tool holder 8 to form a tip 46. The projections 45 end with a small distance at the lateral surfaces 31 and 32 of the recess 30. The end faces of the projections 45 are planar. The projections 4 rest at the projections 43 of the spindle 4 when the tool holder S is attached to the spindle 4 and are tightly pulled against the projections 43 by the clamping and centering head 13 of the pulling member 7. The projections 45 are spaced at an angle of 90° from one another and are narrow. The area between the projections 45 corresponds to an angular zone of approximately 60° to 70°. Between the projections 45 the coolant bores 10 open into the end face 29 of the tool holder 8. The coolant bores 10 are diametrically opposed to one another.

As shown in FIG. 2, a portion of the compressed air bores 11 of the pulling member 7 opens into the conical clamping surface 19 of the clamping and centering head 13.

Via the projections 43 and 45 the tool holder 8 is supported by the afore-described centering and clamping action over a broad planar surface so that a great stability is achieved which is especially advantageous during heavy duty cutting processes The projections 43 and 45 are exposed to compressed air during the clamping operation. Compressed air exits from the compressed air bores 12 and blows dust particles etc. away from the projections 43 and 45 so that no soiling will occur at the planar surfaces. The compressed air supply may be separately controlled in order to achieve an optimum cleaning of the planar surfaces.

Since the clamping and centering head 13 is cylindrical and thus has a rotational symmetry, a simple compressed air supply via small bores 11 opening into the conical clamping surface 19 of the conical clamping and centering element 18 is achieved. When the clamping and centering head 13 approaches the conical mantle surface segments 39, 40 of the tool holder 8, a jet-like compressed air flow is generated in the area of the conical surfaces 19, 39, 40 between the approaching clamping surfaces so that even smallest dust particles etc. will be reliably removed. The centering and clamping element 18 has only a small height so that the danger of enclosure of particles is minimal due to the short cone structure.

The end face 42 of the spindle 4 is divided into annular segments 47 due to the projections 43 (FIG. 3) so that the planar surface area to remain clean are (formed by the end faces of the projection 43) is strongly reduced. Since two compressed air bores 12 open into the end face of each projection 43 (FIG. 3), during the clamping process a jet-like compressed air flow is generated between the two approaching projections 43 and 45 so that a reliable cleaning of the end faces of the projections 43, 45 is ensured. The segments 47 between the projections 43 an 44 serve as particle collecting chambers.

Since the tool holder 8 is supported via its projections 45 at the spindle 4 over a large surface area and is clamped in a centered manner via the clamping and centering head 13 of the pulling member 7, a high static and dynamic stability results. The conical clamping and centering head 13 ensures a high radial and axial positioning precision of the tool holder 8. Furthermore, with the clamping and centering head 13 a force-free and canting-free fitting is ensured so that the described clamping device is also suitable for tools having a great weight. The tool holder 8 may be pushed onto the clamping and centering head 13 in the direction of arrow 48 (FIG. 4) in a radial direction or along an arc according to arrow 49 in FIG. 4. Due to the widening of the recess at its ends the tool holder 8 may be pushed onto the clamping and centering head 13 without difficulties in an arcuate movement.

Since the tool holder 8 is not inserted axially into the spindle but merely pushed onto the clamping and centering head 13 in a radial direction, very short tool exchange times due to the elimination of the axial removal movement will result. The tool holder 8 does not have a steep-angle taper, respectively, no centering shaft so that it is of a light-weight construction. Furthermore, the constructive length of the tool holder 8 is reduced, and for manufacturing the tool holder only a small blank is needed. The tool holder 8 is furthermore insensitive to soiling due to the afore-described embodiment. A planar surface embodied in the form of the end faces of the projections 43, 45 can be easily cleaned. Also, the spindle 4 is not provided with a receiving bore for a steep-angle cone or centering shaft of the tool holder 8 so that the problem of cleaning such a receiving bore is eliminated. At the circumference of the conical centering and clamping element is a uniform force distribution is generated. The clamping action takes place from the inside to the outside. The centrifugal force is compensated by the pre-tensioned axially movable pulling member 7. The clamping and centering head 13 as well as the tool holder 8 are essentially rotational-symmetrical parts which are easily manufactured. The short force-locking between the clamping elements further increases the stability and stiffness of the system. The pulling member 7 must only be moved in an axial direction by a short distance in order to be able to clamp and position the tool holder 8 at the spindle 4. When retracting the pulling member 7, the tool holder 8 is simultaneously clamped and positioned by the clamping and centering head 13. Via the projections 43 and 45 a defined planar contact of the tool holder 8 for supporting the tool is ensured. A longitudinal position of the to 1 holder 8 results automatically due to this planar contact surface.

For a rotational connection of the tool holder 8 with the spindle 4 at least one follower 50 is provided (FIG. 2) which, when the tool holder 8 is clamped to the spindle, extends in a form-locking manner into a groove 51 of the tool holder 8 open toward the end face of the tool holder. As can be seen in FIGS. 2 and 4, the groove 51 is also open to the mantle surface 33 of the cylindrical part 27 of the tool holder 8. The follower 50 is axially slidable in a bore 52 of the spindle 4 which extends parallel to the axis of the spindle and is provided in the form of a cylindrical bolt. The end portion 53 of the follower 50 which is inserted in the bore 52 is provided with a planar flattened portion 54 which advantageously forms a diametrical plane of the follower 50. The flattened portion 54 is provided with a toothing 55 which engages a toothed wheel 56 that is rotatably supported at the spindle 4 and has an axis of rotation perpendicular to the axis of the spindle 4. The pulling member 7 at its outer side is provided with a toothing 57 that is also engaged by the toothed wheel 56. The toothings 55 and 57 are provided such that when the pulling member 7 is retracted the two toothings engage the toothed wheel 56 with their respective remote ends. This ensures that when extending the pulling member 7 the follower 50 is automatically retracted into the spindle 4 while during retraction of the pulling member the follower 50 is extended. When the pulling member 7 is extended into the position represented in a dash-dotted line in FIG. 2 for releasing the tool holder 8, the follower 50 is pushed back into the spindle 4 by the toothed wheel 56 so that the tool holder 8 may be radially removed from the clamping and centering head 13. In this position the tool holder 8 may be easily positioned on the clamping and centering head 13. In order to perform the clamping action, the pulling member 7 is retracted in the afore-described manner whereby the follower 50 is extended from the spindle 4 counter to the movement of the pulling member 7 and engages the groove 51 of the tool holder 8. Thus, the tool holder 8 is form-lockingly connected with the spindle 4 in the direction of rotation. The bottom 58 of the groove 51 which is remote from the end face 29 of the tool holder 8 is planar and extends radially relative to the axis of the tool holder 8 (FIG. 2). The side wall 59 (FIG. 4) which is remote from the outer mantle surface 33 of the cylindrical part 27 extends as a cylinder segment and advantageously has the same radius of curvature as the follower 50. In the engagement position the follower 50, as shown in FIG. 2, is positioned at a slight distance from the bottom 58 of the groove 51. As shown in FIG. 4, the groove 51 is located within one of the annular segments 47 at the end face of the tool holder 8.

The disclosed inventive clamping device is suitable for working centers, turning units, transfer units, and specialty machines. Already existing tool machines may be retrofitted with the inventive clamping device. The tool holder 8 is also especially suitable for automatic exchange operations. The tool holder 8 may be provided with any common clamping and holding devices for fastening the tool 26, such as hydraulic rotary collets, draw-in collets, attachable cutter arbors, ABS-receivers, etc. Commercially available cutters may be connected with an adaptor plate without screws to the spindle 4 so that a very fast tool exchange is possible.

The present invention is, of course, in no way restricted to the specific disclosure of the specification and drawings, but also encompasses any modifications within the scope of the appended claims.

What we claim is:

1. A clamping device for individual tools, said clamping device comprising:
   a spindle;
   a pulling member connected inside said spindle and having a conical clamping and centering element projecting from said spindle; and
   a connecting member of a tool having an end face with a recess, said recess having at least one conical mantle surface cooperating with said conical clamping and centering element for clamping and centering the tool at said spindle.

2. A clamping device according to claim 1, wherein said pulling member further comprises a base body and a neck having a reduced diameter relative to said base body, said clamping and centering element connected with said neck to said base body.

3. A clamping device according to claim 2, wherein said neck is narrower than said recess at said end face of said connecting member.

4. A clamping device according to claim 3, wherein said neck has two parallel outer surfaces extending in a longitudinal direction of said recess.

5. A clamping device according to claim 1, wherein said recess opens perpendicular to an axis of said connecting member.

6. A clamping device according to claim 1, wherein said conical mantle surface is comprised of two conical mantle surface segments arranged on a common imaginary conical mantle surface.

7. A clamping device according to claim 6, wherein said recess extends diametrically in said end face.

8. A clamping device according to claim 1, wherein a width of said recess at said end face of said connecting member is smaller than a diameter of said clamping and centering element.

9. A clamping device according to claim 1, wherein said connecting member is a tool holder.

10. A clamping device for individual tools, said clamping device comprising:
    a spindle;
    a pulling member connected inside said spindle and having a conical clamping and centering element projecting from said spindle;
    a connecting member of a tool having an end face with a recess, said recess having at least one conical mantle surface cooperating with said conical clamping and centering element for clamping and centering the tool at said spindle;
    said conical mantle surface comprised of two conical mantle surface segments arranged on a common imaginary conical mantle surface; and
    said recess extending diametrically in said end face and widening toward an outer mantle surface of said connecting member.

11. A clamping device according to claim 10, wherein said recess has two oppositely arranged lateral surfaces with opposite circular curvatures.

12. A clamping device according to claim 11, wherein each said lateral surface has a shoulder extending perpendicularly to said lateral surfaces toward one another, each said shoulder having one of said conical mantle surface segments.

13. A clamping device according to claim 12, wherein said recess has a planar bottom, said bottom being spaced from said conical mantle surface segments at a distance that is greater than an axial thickness of said clamping and centering element.

14. A clamping device according to claim 13, wherein said recess is smaller at said end face of said connecting member than at said bottom.

15. A clamping device according to claim 12, wherein an axis of the imaginary conical mantle surface on which said conical mantle surface segments are arranged coincides with an axis of said connecting member and an axis of said pulling member.

16. A clamping device for individual tools, said clamping device comprising:
    a spindle;
    a pulling member connected inside said spindle and having a conical clamping and centering element projecting from said spindle;
    a connecting member of a tool having an end face with a recess, said recess having at least one conical mantle surface cooperating with said conical clamping and centering element for clamping and centering the tool at said spindle; and
    wherein said end face of said connecting member has first projections and an end face of said spindle, said end face of said spindle facing said connecting member, has second projections, said spindle and said connecting member contacting one another with aid first and said second projections.

17. A clamping device according to claim 16, wherein first and said second projections are congruent.

18. A clamping device according to claim 16, wherein said spindle further comprises at least one compressed air bore opening within an end face of one of said second projections.

19. A clamping device according to claim 16, wherein said end face of said connecting member further comprises first segment-shaped depressions between said first projections, and said end face of said spindle further comprises second segment-shaped depressions between said second projections.

20. A clamping device according to claim 16, wherein said first projections extend radially relative to an axis of said connecting member and said second projections extend radially to an axis of said spindle.

21. A clamping device according to claim 16, wherein said first projections extend essentially from said recess to an outer mantle surface of said connecting member.

22. A clamping device for individual tools, said clamping device comprising:
    a spindle;
    a pulling member connected inside said spindle and having a conical clamping and centering element projecting from said spindle;
    a connecting member of a tool having an end face with a recess, said recess having at least one conical mantle surface cooperating with said conical clamping and centering element for clamping and centering the tool at said spindle; and wherein said clamping and centering element has a conical clamping surface and compressed air bores opening within said conical clamping surface.

23. A clamping device for individual tools, said clamping device comprising:

a spindle;

a pulling member connected inside said spindle and having a conical clamping and centering element projecting from said spindle;

a connecting member of a tool having an end face with a recess, said recess having at least one conical mantle surface cooperating with said conical clamping and centering element for clamping and centering the tool at said spindle; and at least one follower connected to said connecting member and said spindle for connecting said connecting member and said spindle in a rotationally fixed manner in a direction of rotation of said device.

24. A clamping device according to claim 23, wherein said follower is axially slidably mounted within said spindle.

25. A clamping device according to claim 23, further comprising a means for drivably connecting said follower with said pulling member.

26. A clamping device according to claim 25, wherein said follower is slidable counter to said pulling member.

27. A clamping device according to claim 24, wherein said means for drivably connecting is comprised of a first toothing connected to said pulling member and a toothed wheel connected to said spindle, said first toothing engaging said toothed wheel, and further comprising a second toothing connected to said follower, said second toothing engaged by said toothed wheel.

28. A clamping device according to claim 23, wherein said follower is hidden within said spindle during a tool exchange.

29. A clamping device according to claim 23, wherein said connecting member has a groove at said end face, said groove open to an outer mantle surface of said connecting member.

30. A clamping device according to claim 29, wherein said groove has an inner side wall remote from said outer mantle surface of said connecting member, said inner side wall shaped corresponding to a part of said follower engaging said groove.

* * * * *